US012571970B2

(12) United States Patent
Wang et al.

(10) Patent No.: US 12,571,970 B2
(45) Date of Patent: Mar. 10, 2026

(54) PHOTONICS INTEGRATED CIRCUIT OPTICAL AMPLIFIER

(71) Applicant: II-VI Photonics, Inc., Fuzhou (CN)

(72) Inventors: Xiangfei Wang, Fuzhou (CN); Jun Han, Shanghai (CN); Yajun Wang, Naperville, IL (US)

(73) Assignee: II-VI Photonics, Inc., Fuzhou (CN)

( * ) Notice: Subject to any disclaimer, the term of this patent is extended or adjusted under 35 U.S.C. 154(b) by 660 days.

(21) Appl. No.: 18/099,814

(22) Filed: Jan. 20, 2023

(65) Prior Publication Data

US 2024/0248265 A1     Jul. 25, 2024

(51) Int. Cl.
G02B 6/42      (2006.01)
H01S 3/067     (2006.01)
H01S 3/16      (2006.01)

(52) U.S. Cl.
CPC ......... G02B 6/4209 (2013.01); G02B 6/4215 (2013.01); H01S 3/06754 (2013.01); H01S 3/1608 (2013.01)

(58) Field of Classification Search
CPC . G02B 6/4209; G02B 6/4215; H01S 3/06754; H01S 3/1608
USPC ........................................................ 359/333
See application file for complete search history.

(56) References Cited

U.S. PATENT DOCUMENTS 10,634,843 B2 *  4/2020  Bayn ................... G02B 6/12004
2013/0038925 A1 *  2/2013  Nakagawa ............ H01S 5/0064
                                                                          359/344

2019/0267779 A1 *  8/2019  Baehr-Jones ............. H01S 5/50
2024/0106183 A1 *  3/2024  Qureshi ................ H01S 3/0064

FOREIGN PATENT DOCUMENTS

WO     WO-2005079395 A2 *  9/2005  ........... H01S 3/0632

OTHER PUBLICATIONS

Doerr et al., "Single-Chip Silicon Photonics 100-Gb/s Coherent Transceiver", OFC Postdeadline Papers, Session Th5C, 2014, Published by OSA.

* cited by examiner

*Primary Examiner* — Daniel A Hess
(74) *Attorney, Agent, or Firm* — The Webb Law Firm

(57) ABSTRACT

A photonics integrated circuit chip includes first and second optical waveguides formed on a semiconductor substrate. Light input into the first optical waveguide passes through a first optical isolator and a coupler formed on the substrate. The coupler outputs light from the first optical isolator combined with light from an off-substrate pump light source to an off-substrate optical fiber which outputs the combined light into the second optical waveguide for passage through a second optical isolator formed on the substrate. The substrate may also include third and fourth optical waveguides. Light input into the third optical waveguide passes through a third optical isolator and a second coupler formed on the substrate. The second coupler outputs light from the second optical isolator combined with light from the pump light source to an off-substrate second optical fiber which outputs the combined light into the fourth optical waveguide for passage through a fourth optical isolator formed on the substrate.

23 Claims, 9 Drawing Sheets

PHOTONICS INTEGRATED CIRCUIT OPTICAL AMPLIFIER

BACKGROUND

1. Field

The present disclosure describes photonics optical amplifiers and related elements integrated into Photonics Integrated Circuits (PICs) to minimize the passive parts of an optical fiber amplifier.

2. Description of Related Art

Semiconductor optical amplifiers (SOA) of compact size can be used to amplify optical signals. The use of prior art SOA's is hampered by their lack of relatively quick response. Parameters like sensitivity, nonlinear effects, polarization, and high junction losses make these amplifiers harder to use than Erbium-Doped Fiber Amplifiers (EDFA).

Existing EDFA are made of discrete optical components which are difficult to fit along with a coherent transceiver together into small form factor like a Quad Small Form-factor Pluggable (QSFP) or QSFP-DD.

SUMMARY

Disclosed herein is an optical amplifier that includes a preamp, at least one optical amplifier, and optical interfaces. All the passive parts of the optical amplifier may be integrated, along with a coherent transceiver, onto a Photonics Integrated Circuit (PIC) chip.

The PIC chip may be formed from one or more of Si, InP, GaAs, silica, and polymer, and may have ultra-small size. The PIC chip may include an optical transmitter, e.g., a coherent transmitter, an optical receiver, e.g., a coherent receiver, or both, i.e., a transceiver, e.g., a coherent transceiver, and other passive elements. The passive elements may include, but is/are not limited to, optical isolators, couplers to couple pump light, and one or more tap or monitor photodiodes for monitoring signal light propagating on or through one or more optical waveguides formed on the PIC chip.

The PIC chip may include a preamp optical amplifier that may be configured to amplify signals received from the coherent receiver in the first direction. The PIC chip may include a booster optical amplifier that may be configured to amplify the signals received from the coherent transmitter in the second direction. The preamp and the booster amplifier may share the same pump light source.

Erbium fibers, a pump light source, e.g. a pump laser, and a continuous wave (CW) laser for the coherent transceiver may be disposed or positioned off of the PIC chip. The preamp and the booster amplifier may share the same pump light source.

Also disclosed herein are examples of doped-fiber amplifiers that integrate the passive parts into PIC chip, leaving the pump laser and doped-fiber(s) outside the PIC chip. The PIC amplifier may be an Erbium-Doped Fiber Amplifier (EDFA).

Also disclosed herein is a photonics integrated circuit (PIC) chip comprising: a substrate formed of semiconductor material and first and second optical waveguides formed on the substrate, wherein each optical waveguide defines a path having first and second ends. A first optical isolator is formed on the substrate in the path of the first optical waveguide to receive light input into the first end of the first optical waveguide. The first optical isolator is operative for allowing the passage of the light input into the first end of the first optical waveguide and to avoid or prevent a reflection of the light back to the first end of the first optical waveguide after passage through the first optical isolator. A coupler is formed on the substrate in the path of the first optical waveguide after the first optical isolator. The coupler is operative for combining the light from the first optical isolator with light from a pump light source positioned off of the substrate and for outputting the combined light from the coupler via the second end of the first optical waveguide to an optical fiber positioned off of the substrate. A second optical isolator is also formed on the substrate in the path of the second optical waveguide to receive the combined light input into the first end of the second optical waveguide from the optical fiber. The second optical isolator is operative for allowing the passage of the combined light input into the first end of the second optical waveguide from the optical fiber and to avoid or prevent a reflection of the amplified light back to the first end of the second optical waveguide after passage through the second optical isolator.

Third and fourth optical waveguides may be formed on the substrate, wherein each optical waveguide defines a path having first and second ends. A third optical isolator may be formed on the substrate in the path of the third optical waveguide to receive light input into the first end of the third optical waveguide. The third optical isolator may be operative for allowing the passage of the light input into the first end of the third optical waveguide and to avoid or prevent a reflection of the light back to the first end of the third optical waveguide after passage through the third optical isolator. A second coupler may be formed on the substrate in the path of the third optical waveguide after the third optical isolator. The second coupler may be operative for combining the light from the third optical isolator with light from the pump light source positioned off of the substrate and for outputting the combined light from the second coupler via the second end of the third optical waveguide to a second optical fiber positioned off of the substrate. A fourth optical isolator may be formed on the substrate in the path of the fourth optical waveguide to receive the combined light input into the first end of the fourth optical waveguide from the second optical fiber. The fourth optical isolator may be operative for allowing the passage of the combined light input into the first end of the fourth optical waveguide from the second optical fiber and to avoid or prevent a reflection of the combined light back to the first end of the fourth optical waveguide after passage through the fourth optical isolator.

A coherent transmitter may be formed on the substrate and have an output (T) coupled to the first end of the first optical waveguide and an input (L) coupled to an output of a continuous wave (CW) light source positioned off of the substrate.

A coherent receiver may be formed on the substrate and have an input (R) coupled to the second end of the fourth optical waveguide and another input coupled to the output of the continuous wave (CW) light source positioned off of the substrate, e.g., via the input L.

One or more tap photodiode may be formed on the substrate and coupled to at least one of the first, second, third and fourth optical waveguides. Each tap photodiode is operative for monitoring a power of the light propagating in the optical waveguide to which the tap photodiode is coupled and for providing an indication of the monitored power to a processor or computer controlled controller for processing.

BRIEF DESCRIPTION OF THE DRAWING(S)

DESCRIPTION

Figure 1:
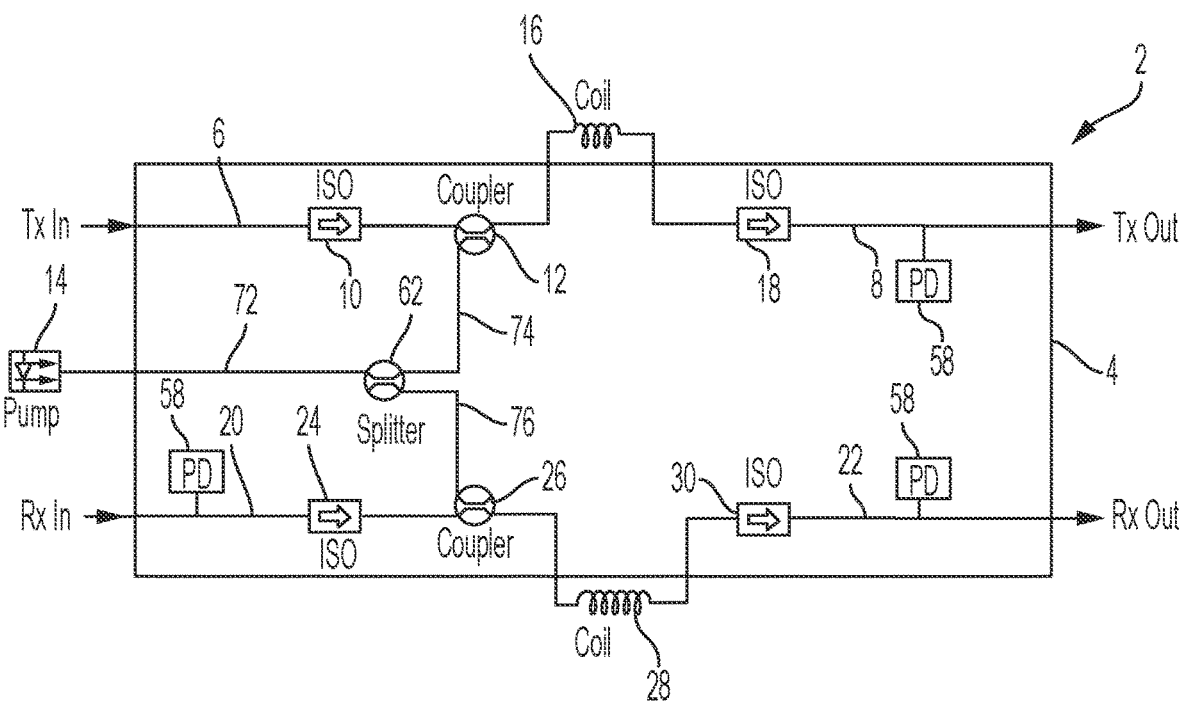
FIG. 1 is a schematic of an example Photonics Integrated Circuit (PIC) including transmit and receive photonics optical amplifiers in accordance with the principles of the present disclosure.

Various non-limiting examples will now be described with reference to the accompanying figures where like reference numbers correspond to like or functionally equivalent elements.

For purposes of the description hereinafter, terms like "end." "upper." "lower." "right," "left," "vertical," "horizontal," "top." "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the disclosure. Hence, the specific examples or aspects disclosed herein are not to be construed as limiting.

With reference to FIG. 1, one non-limiting example photonics integrated circuit (PIC) chip 2 in accordance with the principles of the present disclosure includes a substrate 4 formed of a semiconductor material, such as, without limitation, silicon. A first optical waveguide 6 and a second optical waveguide 8 are formed on the substrate 4. Each optical waveguide 4, 6 defines a path having first and second ends.

A first optical isolator 10 is formed on the substrate 4 in the path of the first optical waveguide 6 to receive light input into the first end (Tx In) of the first optical waveguide 6. The first optical isolator 10 is operative for allowing the passage of the light input into the first end of the first optical waveguide 6 and to avoid or prevent a reflection of the light back to the first end of the first optical waveguide after passage through the first optical isolator 10.

A coupler 12 is formed on the substrate 4 in the path of the first optical waveguide 6 after the first optical isolator 10. The coupler 12 is operative for combining the light from the first optical isolator 10 with light from a pump light source 14 positioned off of the substrate 4 and for outputting the combined light from the coupler via the second end of the first optical waveguide to an optical fiber 16 positioned off of the substrate 4.

A second optical isolator 18 is formed on the substrate 4 in the path of the second optical waveguide 8 to receive the combined light input into the first end of the second optical waveguide 8 from the optical fiber 16. The second optical isolator 18 is operative for allowing the passage of the combined light input into the first end of the second optical waveguide 8 from the optical fiber 16 to a second end (Tx Out) of the second optical waveguide 8 and to avoid or prevent a reflection of the combined light back to the first end of the second optical waveguide after passage through the second optical isolator 18.

The combination of first optical isolator 10, coupler 12, pump light source 14, optical fiber 16, second optical isolator 18, and optical waveguides 6, 8 comprise a transmit optical amplifier that may be used in an optical fiber transmission network to amplify or boost optical signals received (Tx In) from an upstream optical source and to transmit (Tx Out) the amplified or boosted optical signals to a downstream optical source.

A third optical waveguide 20 and a fourth optical waveguide 22 may also formed on the substrate 4. Each optical waveguide 20, 22 defines a path having first and second ends. A third optical isolator 24 is formed on the substrate 4 in the path of the third optical waveguide 20 to receive light input into the first end (Rx In) of the third optical waveguide 20. The third optical isolator 24 is operative for allowing the passage of the light input into the first end of the third optical waveguide 20 and to avoid or prevent a reflection of the light back to the first end of the third optical waveguide after passage through the third optical isolator 20.

A second coupler 26 is formed on the substrate 4 in the path of the third optical waveguide 20 after the third optical isolator 24. The second coupler 26 is operative for combining the light from the third optical isolator 24 with light from the pump light source 14 positioned off of the substrate 4 and for outputting the combined light from the second coupler 26 via the second end of the third optical waveguide 20 to a second optical fiber 28 positioned off of the substrate 4.

A fourth optical isolator 30 is formed on the substrate 4 in the path of the fourth optical waveguide 22 to receive the combined light input into the first end of the fourth optical waveguide 22 from the second optical fiber 28. The fourth optical isolator 30 is operative for allowing the passage of the combined light input into the first end of the fourth optical waveguide 22 from the second optical fiber 28 to a second end (Rx Out) of the fourth optical waveguide 22 and to avoid or prevent a reflection of the combined light back to the first end of the fourth optical waveguide 22 after passage through the fourth optical isolator 30.

The combination of third optical isolator 24, second coupler 26, pump light source 14, optical fiber 28, fourth optical isolator 30, and optical waveguides 20, 22 comprise a receive optical amplifier that may be used in an optical fiber transmission network to amplify or boost optical signals received (Rx In) from an upstream optical source and to transmit (Rx Out) the amplified or boosted optical signals to a downstream optical source.

One or more photodiodes (PD) 58 may be coupled to one or more of the optical waveguides for monitoring a power or intensity of the light propagating in the optical waveguide to which the PD 58 is coupled. In the non-limiting example shown in FIG. 1, PDs 58 are connected to optical waveguide 8 (e.g., between optical isolator 18 and Tx Out), optical waveguide 20 (e.g., between Rx In and optical isolator 24), and optical waveguide 22 (e.g., between optical isolator 30 and Rx Out). However, a PD 58 may also be coupled to any other suitable and/or desirable point of optical waveguide 6 and/or 8. Herein, the terms "tap photodiode", "photodiode" and "PD" may be used interchangeably.

Throughout this disclosure, it is to be understood that the output (not shown) of each PD 58 may be coupled to a controller (not shown) positioned off of the substrate 4. This controller may include circuitry, e.g., without limitation, an analog-to-digital converter and a processor, for processing the output of each PD 58 for the purpose of monitoring and controlling the optical power or intensity of light propagating in at least the optical waveguide to which the PD 58 is coupled.

The pump light source 14 may provide pump light to directly each coupler 12 and 26 via one or more optical waveguides (not shown) formed on the substrate 4 or, as shown in FIG. 1, via an optional optical waveguide 72 that may be formed on the substrate 4, an optional splitter 62 that may be formed on the substrate 4, and optional optical waveguides 74 and 76 that may be formed on the substrate 4. In another example, each coupler 12 and 26 may be connected to receive pump light from a separate pump light source (each like pump light source 14) via a dedicated optical waveguide (not shown) formed on the substrate 4. Each optical fiber 16 and 28 may be an erbium-doped fiber.

Throughout this disclosure, light input into and/or propagating through each optical waveguide formed on the substrate may be laser light and the light from the pump light source 14 may also be laser light.

Moreover, throughout this disclosure, elements described as being "formed on" the substrate 4, e.g., optical waveguides, optical isolators, couplers, PDs, splitters, etc., are formed to be part of substrate 4 using conventional semiconductor manufacturing/processing techniques known in the art. Accordingly, details of how these elements are formed on the substrate 4 will not be described herein for the purpose of simplicity. Moreover, the physical arrangement of the elements formed on the substrate 4 shown in the figures is not to be construed in a limiting sense since it is envisioned that the elements may be arranged in any suitable and/or desirable manner.

Figure 2A:
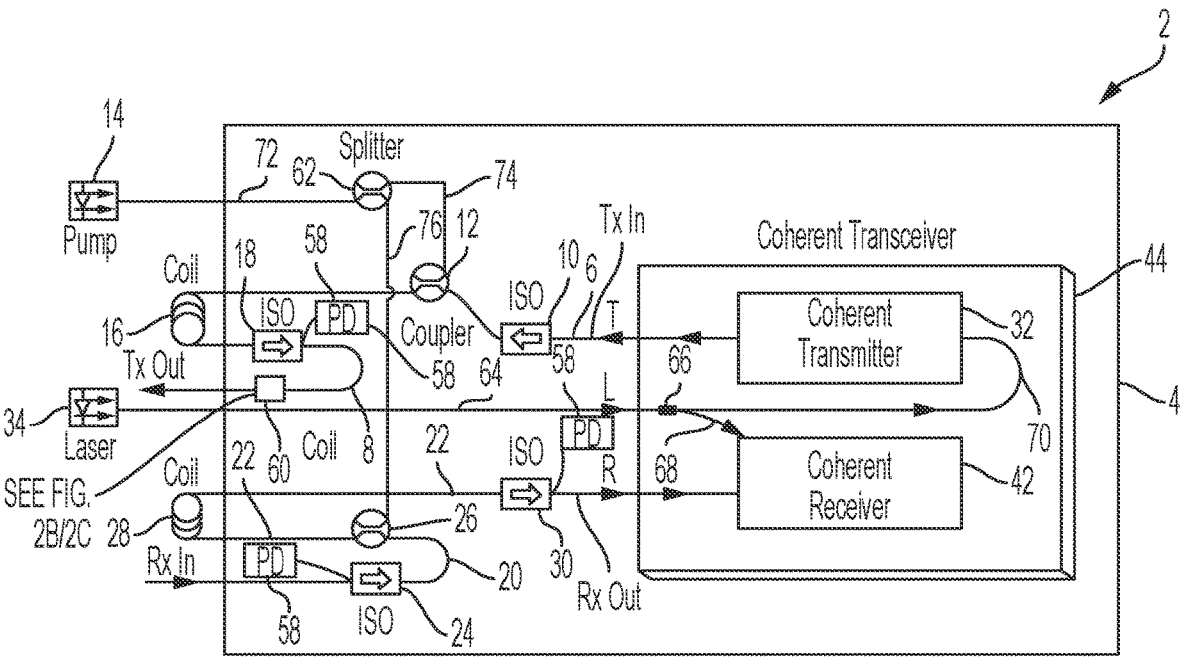
FIG. 2A is a schematic of another example PIC including transmit and receive photonics optical amplifiers along with block diagrams of a coherent transmitter and a coherent receiver that comprise a coherent transceiver in accordance with the principles of the present disclosure.

With reference to FIG. 2A, another non-limiting example photonics integrated circuit (PIC) chip 2 in accordance with the principles of the present disclosure may include the same or (in this example) a different physical arrangement of the elements shown in FIG. 1, but connected in the same manner as shown in FIG. 1, and may further include a transmitter, e.g., a coherent transmitter 32, formed on the substrate 4, or a receiver, e.g., a coherent receiver 42, formed on the substrate 4, or a transceiver, e.g., a coherent transceiver 44, formed on the substrate 4, which includes the combination of the coherent transmitter 32 and the coherent receiver 42. The PIC chip shown in FIG. 2A may also include an optional element 60 (described hereinafter) formed on the substrate 4 in the path of the second optical waveguide 8 between the second optical isolator 18 and the second end (Tx Out) of the second optical waveguide 8 for conditioning optical signals prior to output via the second end (Tx Out) of the second optical waveguide 8

A controller (not shown), positioned off of the substrate 4, may provide digital data to an input (not shown) of the coherent transmitter 32 which converts or modulates the digital data into modulated light signals which are output to the first end (Tx In) of the first optical waveguide 6; or may receive from the coherent receiver 42 digital data converted or demodulated by the coherent receiver 42 from modulated light signals provided to the input of the coherent receiver 42 from the second end (Rx Out) of the fourth optical waveguide 22; or both. This controller may be the same or a different controller that is coupled to the output (not shown) of each PD 58 that is used for processing the output of each PD 58 for the purpose of monitoring and controlling the optical power or intensity of light propagating in at least the optical waveguide to which the PD 58 is coupled.

A laser, in the nature of a continuous wave (CW) light source 34, positioned off of the substrate 4 may provide CW light (e.g., CW laser light) to the coherent transmitter 32 for modulating the digital data provided to the input (not shown) of the coherent transmitter 32 into modulated light signals that are output to the first end (Tx In) of the first optical waveguide 6; or may provide the CW light to the coherent receiver 42 for demodulating digital data from the modulated light signals provided to the input of the coherent receiver 42 from the second end (Rx Out) of the fourth optical waveguide 22; or to both.

The pump light source 14 may provide pump light to directly each coupler 12 and 26 via one or more optical waveguides (not shown) formed on the substrate 4 or, as shown in FIG. 2A, via an optional optical waveguide 72 that may be formed on the substrate 4, an optional splitter 62 that may be formed on the substrate 4, and optional optical waveguides 74 and 76 that may be formed on the substrate 4. In another example, each coupler 12 and 26 may be connected to receive pump light from a separate pump light source (each like pump light source 14) via a dedicated optical waveguide (not shown) formed on the substrate 4. Each optical fiber 16 and 28 may be an erbium-doped fiber.

An optical waveguide 64 formed on the substrate 4 provides the CW light from the CW light source 34, positioned off of the substrate, to a splitter 66 formed on the substrate 4 which, in-turn, provides the CW light to the coherent receiver 42 via an optical waveguide 68 formed on the substrate 4; provides the CW light to the coherent transmitter 32 via an optical waveguide 70 formed on the substrate 4; or both.

One or more photodiodes (PD) 58 may be coupled to one or more of the optical waveguides for monitoring a power or intensity of light propagating in the optical waveguide to which the PD 58 is coupled. In the non-limiting example shown in FIG. 2A. PDs 58 are connected to optical waveguide 8 (e.g., between optical isolator 18 and Tx Out), to optical waveguide 20 (e.g., between Rx In and optical isolator 24), and to optical waveguide 22 (e.g., between optical isolator 30 and Rx Out). However, one or more additional PDs 58 may also be coupled to any one or more other suitable and/or desirable points of each optical waveguide.

As described above in connection with FIG. 1, the combination of first optical isolator 10, coupler 12, pump light source 14, optical fiber 16, second optical isolator 18, and at least optical waveguides 6, 8 in FIG. 2A may comprise a transmit optical amplifier that may be used in an optical fiber transmission network to amplify or boost optical signals received (Tx In) from an upstream optical source and to transmit (Tx Out) the amplified or boosted optical signals to a downstream optical source. The combination of third optical isolator 24, second coupler 26, pump light source 14, optical fiber 28, fourth optical isolator 30, and optical waveguides 20, 22 in FIG. 2A may comprise a receive optical amplifier that may be used in an optical fiber transmission network to amplify or boost optical signals received (Rx In) from an upstream optical source and to transmit (Rx Out) the amplified or boosted optical signals to a downstream optical source.

Figure 2B:
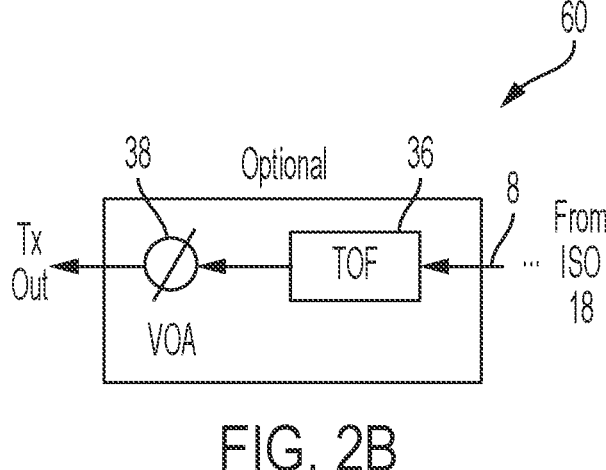
FIG. 2B is a schematic block diagram of optional Tunable Optical Filter (TOF) and Variable Optical Attenuator (VOA) that may be used for conditioning optical signals prior to output via a Tx Out port of the PIC of FIG. 2A.

With reference to FIG. 2B and with continuing reference to FIG. 2A, in an example, the optional element 60 may include a tunable optical filter (TOF) 36 formed on the substrate 4 in the path of the second optical waveguide 8 after the second optical isolator 18 and a variable optical attenuator (VOA) 38 formed on the substrate 4 in the path of the second optical waveguide 8 after the TOF 36. The TOF may be operative or configured to transmit the combined light from the second optical isolator 18 in a predetermined range of wavelengths and to absorb light at other wavelengths. The VOA may be operative or configured to reduce a power level of the transmitted combined light in the predetermined range of wavelengths from the TOF and to output the reduced power level transmitted combined light to the second end (Tx Out) of the second optical waveguide 8.

Figure 2C:
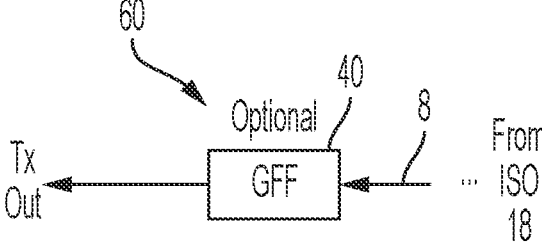
FIG. 2C is a schematic block diagram of an optional Gain Flatness Filter (GFF) that may be used for conditioning optical signals prior to output via the Tx Out port of the PIC of FIG. 2A.

With reference to FIG. 2C and with continuing reference to FIG. 2A, in another example, the optional element 60 may include a gain flatness filter (GFF) 40 formed on the substrate in the path of the second optical waveguide after the second optical isolator 18. The GFF 40 may be operative or configured for flattening or smoothing out unequal intensities over a predetermined wavelength range in the combined light from the second optical isolator 18 and to output the flattened or smoothed out combined light to the second end (Tx Out) of the second optical waveguide 8.

Figure 3A:
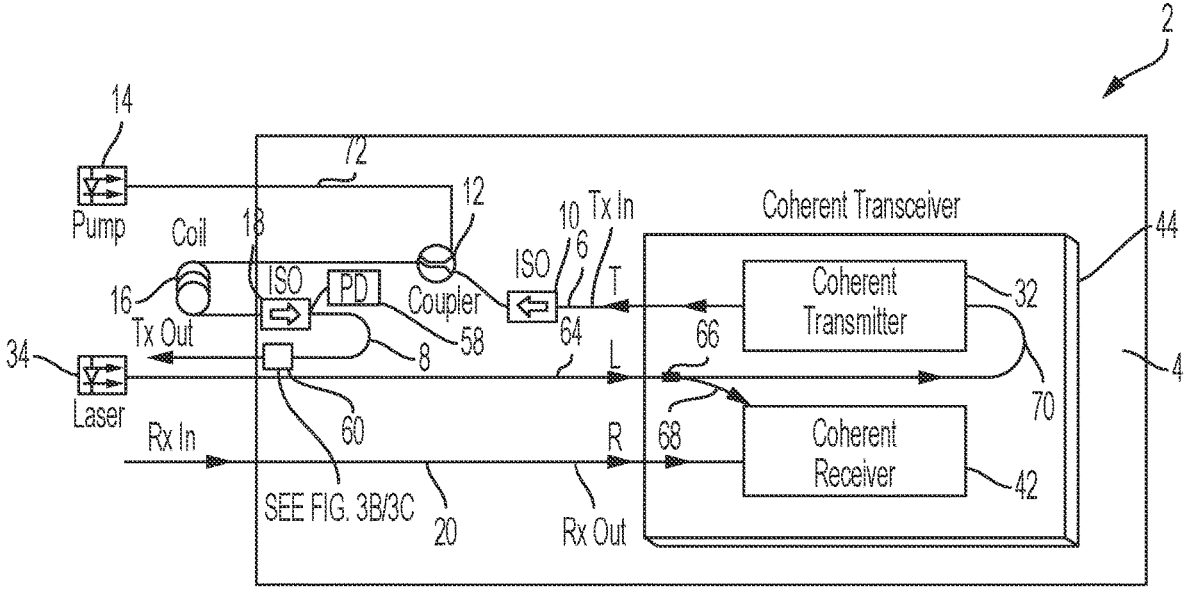
FIG. 3A is a schematic of another example PIC including a photonics optical amplifier along with block diagrams of a coherent transmitter and a coherent receiver that comprise a coherent transceiver in accordance with the principles of the present disclosure.

With reference to FIG. 3A, another non-limiting example photonics integrated circuit (PIC) chip 2 in accordance with the principles of the present disclosure may include the transmit optical amplifier of FIG. 2A (comprising the combination of first optical isolator 10, coupler 12, pump light source 14, optical fiber 16, second optical isolator 18, and optical waveguides 6, 8, and (optionally) 72) but may exclude the receive optical amplifier of FIG. 2A (comprising the combination of third optical isolator 24, second coupler 26, pump light source 14, optical fiber 28, fourth optical isolator 30, splitter 62 (if provided) and at least optical waveguides 20, 22) in favor of a direct connection between the first end (Rx In) of the third optical waveguide 20 and the second end (Rx Out) of the third optical waveguide 20 connected, in this example, directly to an input of the coherent receiver 42.

A controller (not shown), positioned off of the substrate 4, may provide digital data to an input (not shown) of the coherent transmitter 32 which converts or modulates the digital data into modulated light signals which are output to the first end (Tx In) of the first optical waveguide 6; or may receive from the coherent receiver 42 digital data converted or demodulated by the coherent receiver 42 from modulated light signals provided to the input of the coherent receiver 42 from the second end (Rx Out) of the third optical waveguide 20; or both. This controller may be the same or a different controller that is coupled to the output (not shown) of each PD 58 that is used for processing the output of each PD 58 for the purpose of monitoring and controlling the optical power or intensity of light propagating in at least the optical waveguide to which the PD 58 is coupled.

A laser, e.g., a continuous wave (CW) light source 34, positioned off of the substrate 4 may provide, via optical waveguide 64, splitter 66, and optical waveguide 70, CW light (e.g., CW laser light) to the coherent transmitter 32 for modulating the digital data provided to the input (not shown) of the coherent transmitter 32 into the modulated light signals that are output to the first end (Tx In) of the first optical waveguide 6; or may provide, via optical waveguide 64, splitter 66, and optical waveguide 68, the CW light to the coherent receiver 42 for demodulating digital data from the modulated light signals input into the coherent receiver 42 from the second end (Rx Out) of the third optical waveguide 20; or to both.

One or more photodiodes (PD) 58 may be coupled to one or more of the optical waveguides for monitoring a power or intensity of light propagating in the optical waveguide to which the PD 58 is coupled. In the non-limiting example shown in FIG. 3A, a PD 58 is connected to optical waveguide 8 (e.g., between optical isolator 18 and Tx Out). However, one or more additional PDs 58 may also be coupled to any one or more other suitable and/or desirable points of each optical waveguide.

Figure 3B:
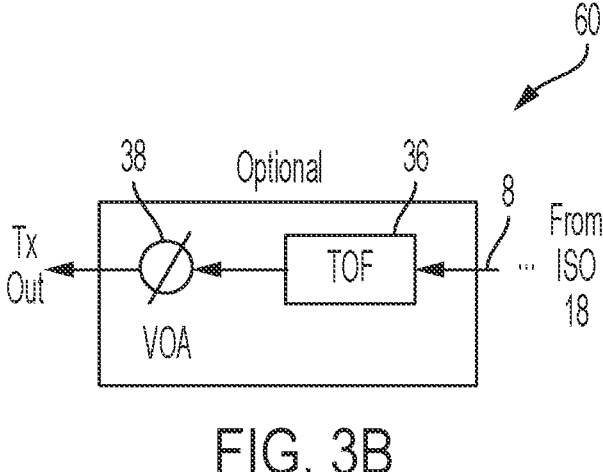
FIG. 3B is a schematic block diagram of optional Tunable Optical Filter (TOF) and Variable Optical Attenuator (VOA) that may be used for conditioning optical signals prior to output via a Tx Out port of the PIC of FIG. 3A.

With reference to FIG. 3B and with continuing reference to FIG. 3A, in an example, the optional element 60 may include a tunable optical filter (TOF) 36 formed on the substrate 4 in the path of the second optical waveguide 8 after the second optical isolator 18 and a variable optical attenuator (VOA) 38 formed on the substrate 4 in the path of the second optical waveguide 8 after the TOF 36. The TOF may be operative or configured to transmit the combined light from the second optical isolator 18 in a predetermined range of wavelengths and to absorb light at other wavelengths. The VOA may be operative or configured to reduce a power level of the transmitted combined light in the predetermined range of wavelengths from the TOF and to output the reduced power level transmitted combined light to the second end (Tx Out) of the second optical waveguide 8.

Figure 3C:
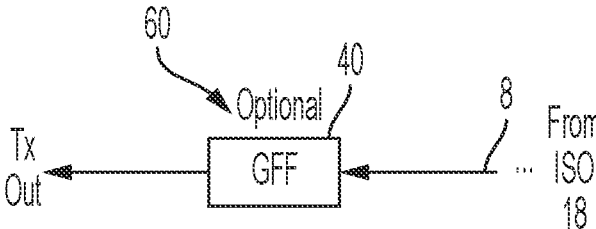
FIG. 3C is a schematic block diagram of an optional Gain Flatness Filter (GFF) that may be used for conditioning optical signals prior to output via the Tx Out port of the PIC of FIG. 3A.

With reference to FIG. 3C and with continuing reference to FIG. 3A, in another example, the optional element 60 may include a gain flatness filter (GFF) 40 formed on the substrate in the path of the second optical waveguide after the second optical isolator 18. The GFF 40 may be operative or configured for flattening or smoothing out unequal intensities over a predetermined wavelength range in the combined light from the second optical isolator 18 and to output the flattened or smoothed out combined light to the second end (Tx Out) of the second optical waveguide 8.

Figure 4:
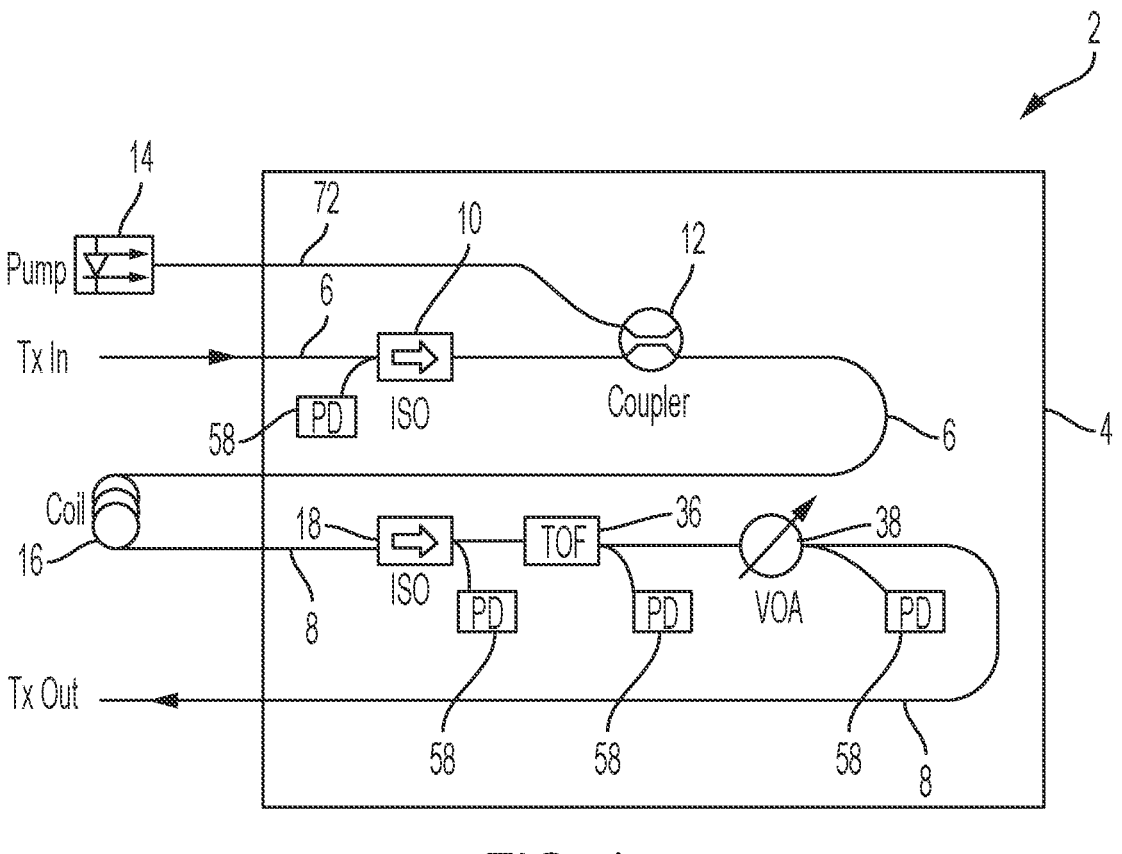
FIG. 4 is a schematic of another example PIC including a photonics optical amplifier in accordance with the principles of the present disclosure.

With reference to FIG. 4, another non-limiting example photonics integrated circuit (PIC) chip 2 in accordance with the principles of the present disclosure may include a first optical isolator 10 formed on the substrate 4 in the path of the first optical waveguide 6 to receive light input into the first end (Tx In) of the first optical waveguide 6. The first optical isolator 10 is operative for allowing the passage of the light input into the first end of the first optical waveguide

6 and to avoid or prevent a reflection of the light back to the first end of the first optical waveguide after passage through the first optical isolator 10.

A coupler 12 is formed on the substrate 4 in the path of the first optical waveguide 6 after the first optical isolator 10. The coupler 12 is operative for combining the light from the first optical isolator 10 with light from a pump light source 14 positioned off of the substrate 4 and for outputting the combined light from the coupler via the second end of the first optical waveguide to an optical fiber 16 positioned off of the substrate 4. The optical fiber 16 may be an erbium-doped fiber. The pump light source 14 may provide pump light to directly coupler 12 or, as shown in FIG. 4, via an optical optical waveguide 72 that may be formed on the substrate 4.

A second optical isolator 18 is formed on the substrate 4 in the path of the second optical waveguide 8 to receive the combined light input into the first end of the second optical waveguide 8 from the optical fiber 16. The second optical isolator 18 is operative for allowing the passage of the combined light input into the first end of the second optical waveguide 8 from the optical fiber 16 to a tunable optical filter (TOF) 36 formed on the substrate 4 in the path of the second optical waveguide 8 after the second optical isolator 18 and a variable optical attenuator (VOA) 38 formed on the substrate 4 in the path of the second optical waveguide 8 after the TOF 36. The TOF 36 may be operative or configured to transmit the combined light from the second optical isolator 18 in a predetermined range of wavelengths and to absorb light at other wavelengths. The VOA 38 may be operative or configured to reduce a power level of the transmitted combined light in the predetermined range of wavelengths from the TOF and to output the reduced power level transmitted combined light to the second end (Tx Out) of the second optical waveguide 8.

The combination of first optical isolator 10, coupler 12, pump light source 14, optical fiber 16, second optical isolator 18, TOF 36, VOA 38, and at least optical waveguides 6, 8 comprise a standalone transmit optical amplifier that may be used in an optical fiber transmission network to amplify or boost optical signals received (Tx In) from an upstream optical source and to transmit (Tx Out) the amplified or boosted optical signals to a downstream optical source.

One or more photodiodes (PD) 58 may be coupled to one or more of the optical waveguides at any suitable and/or desirable locations for monitoring a power or intensity of light propagating in the optical waveguide to which the PD 58 is coupled. In the non-limiting example shown in FIG. 4, PDs 58 are connected to optical waveguide 6 (e.g., between Tx In and optical isolator 10) and to optical waveguide 8 (e.g., between optical isolator 18 and TOF 36, between TOF 36 and VOA 38, and between VOA 38 and Tx Out). However, one or more additional PDs 58 may also be coupled to any one or more other suitable and/or desirable points of each optical waveguide.

Figure 5:
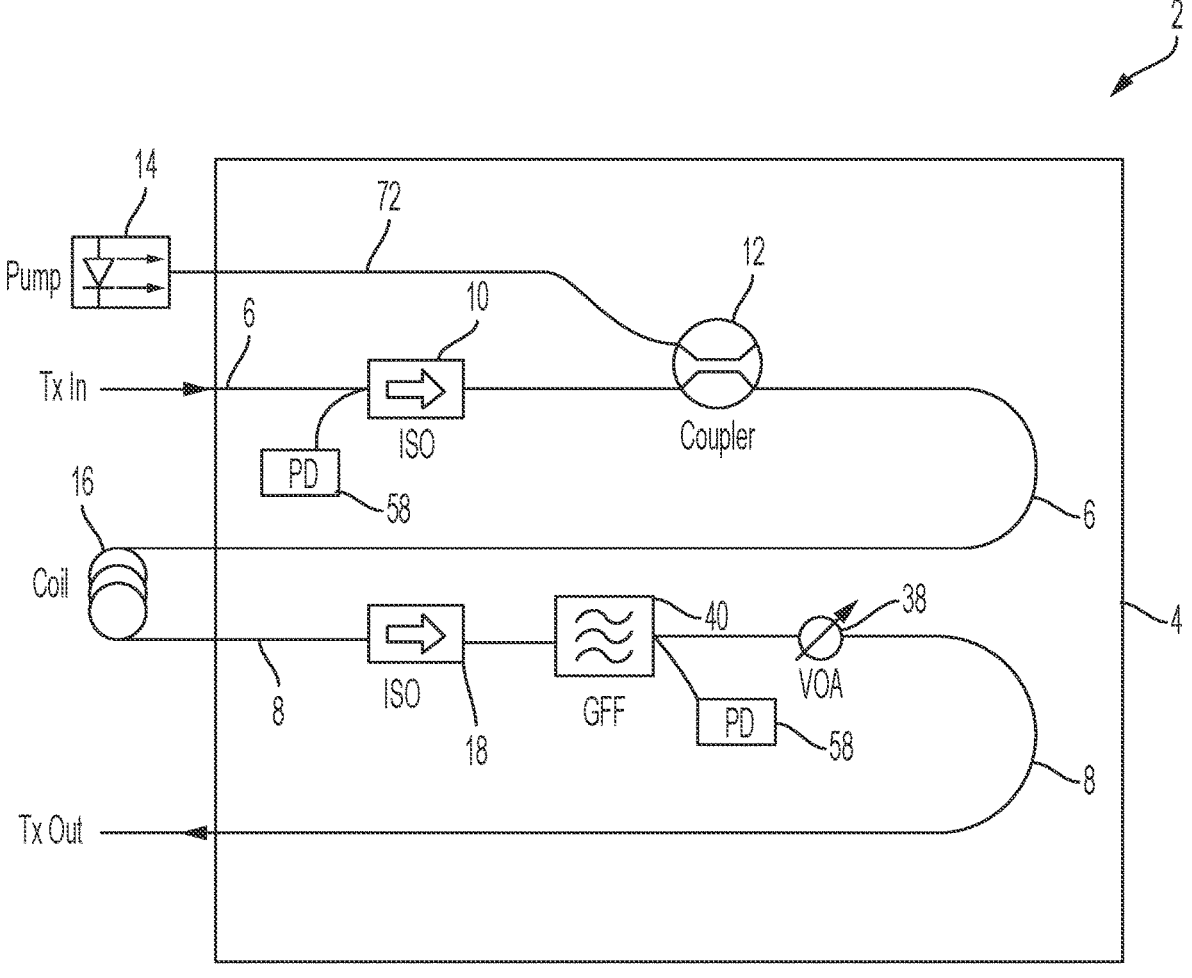
FIG. 5 is a schematic of another example PIC including a photonics optical amplifier in accordance with the principles of the present disclosure.

With reference to FIG. 5, another non-limiting example photonics integrated circuit (PIC) chip 2 in accordance with the principles of the present disclosure may, with one exception (discussed next), include same elements that operate in the same manner as the standalone transmit optical amplifier of FIG. 4 (namely, the first optical isolator 10, the coupler 12, the pump light source 14, the optical fiber 16, the second optical isolator 18, the VOA 38, and at least optical waveguides 6, 8). The exception is that the TOF 36 in FIG. 4 is replaced in the PIC chip of FIG. 5 with a GFF 40 which may be operative or configured for flattening or smoothing out unequal intensities over a predetermined wavelength range in the combined light (initially output by the coupler 12) received from the second optical isolator 18 and to output the flattened or smoothed out combined light to the VOA 38.

The combination of the first optical isolator 10, the coupler 12, the pump light source 14, the optical fiber 16, the second optical isolator 18, the GFF 40, the VOA 38, and at least optical waveguides 6, 8 comprise a standalone transmit optical amplifier that may be used in an optical fiber transmission network to amplify or boost optical signals received (Tx In) from an upstream optical source and to transmit (Tx Out) the amplified or boosted optical signals to a downstream optical source.

One or more photodiodes (PD) 58 may be coupled to one or more of the optical waveguides at any suitable and/or desirable locations for monitoring a power or intensity of light propagating in the optical waveguide to which the PD 58 is coupled. In the non-limiting example shown in FIG. 5, PDs 58 are connected to optical waveguide 6 (e.g., between Tx In and first optical isolator 10) and to optical waveguide 8 (e.g., between the GFF 40 and VOA 38). However, one or more additional PDs 58 may also be coupled to any one or more other suitable and/or desirable points of each optical waveguide.

Figure 6:
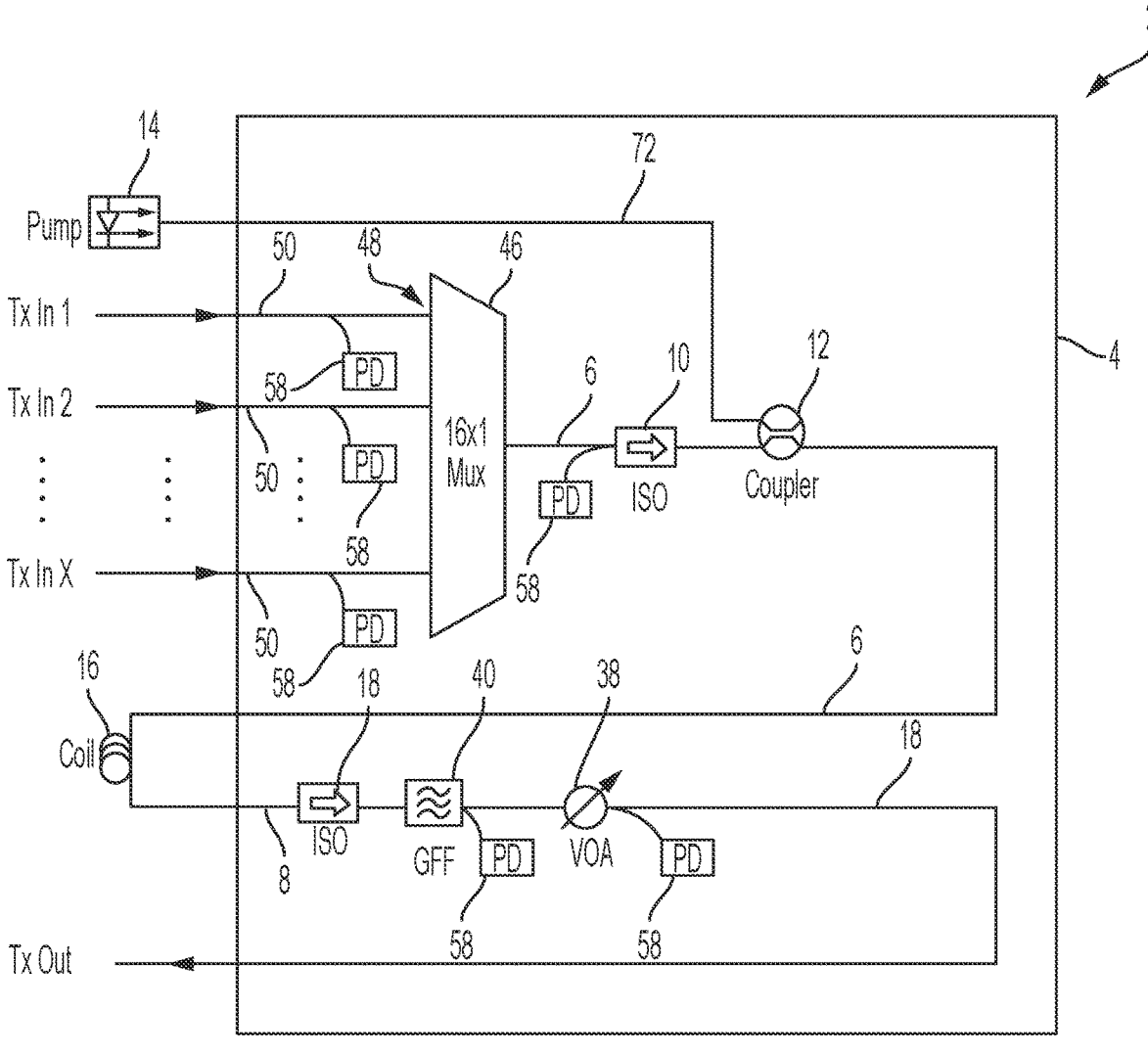
FIG. 6 is a schematic of another example PIC including an input optical multiplexer and a photonics optical amplifier in accordance with the principles of the present disclosure.

With reference to FIG. 6, another non-limiting example photonics integrated circuit (PIC) chip 2 in accordance with the principles of the present disclosure may, with one exception (discussed next), include same elements that operate in the same manner as the standalone transmit optical amplifier of FIG. 5 (namely, the first optical isolator 10, the coupler 12, the pump light source 14, the optical fiber 16, the second optical isolator 18, the GFF 40, the VOA 38, and at least optical waveguides 6, 8). The exception in this example is the introduction of an input optical multiplexer 46 formed on the substrate 4 having a number of optical inputs 48 connected via input optical waveguides 50 formed on the substrate 4 to receive optical signals (Tx In 1, Tx In 2, . . . , Tx In X) from upstream optical sources, to multiplex the received optical signals, and to output the multiplexed received optical signals to the first optical isolator 10.

In this example, the combination of the input optical multiplexer 46, the first optical isolator 10, the coupler 12, the pump light source 14, the optical fiber 16, the second optical isolator 18, the GFF 40, the VOA 38, and at least optical waveguides 6, 8 comprise a standalone transmit optical amplifier that may be used in an optical fiber transmission network to amplify or boost multiplexed optical signals received (Tx In) from a number of upstream optical sources and to transmit (Tx Out) the amplified or boosted multiplexed optical signals to a downstream optical element or receiver.

One or more photodiodes (PD) 58 may be coupled to one or more of the optical waveguides at any suitable and/or desirable locations for monitoring a power or intensity of light propagating in the optical waveguide to which the PD 58 is coupled. In the non-limiting example shown in FIG. 6. PDs 58 are connected to optical waveguide 6 (e.g., between the input optical multiplexer 46 and first optical isolator 10) and to optical waveguide 8 (e.g., between the GFF 40 and VOA 38, and between the VOA 38 and Tx Out). Moreover, a PD 58 is connected to each input optical waveguide 50.). However, one or more additional PDs 58 may also be coupled to any one or more other suitable and/or desirable points of each optical waveguide.

Figure 7:
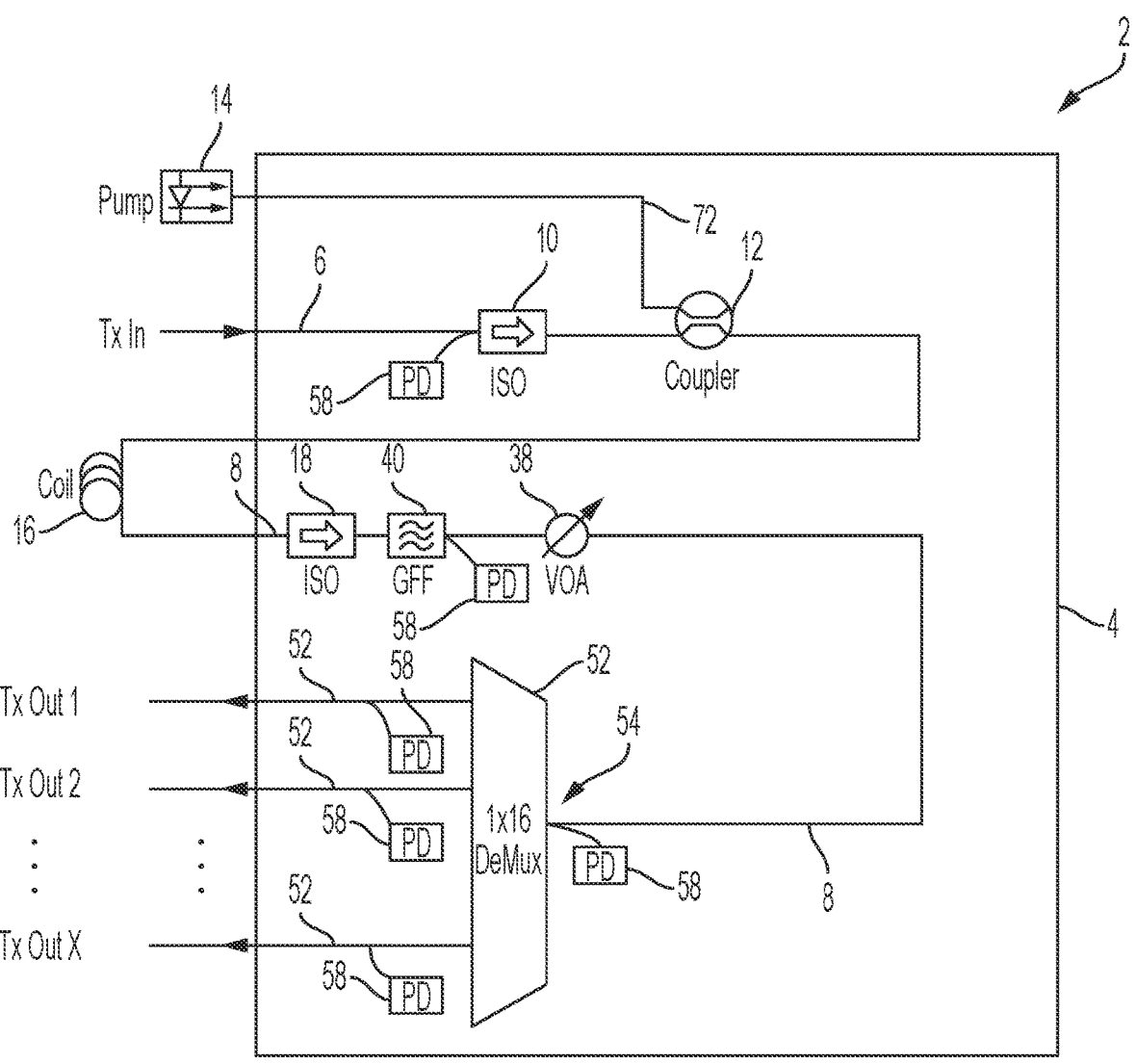
FIG. 7 is a schematic of another example PIC including an output optical demultiplexer and a photonics optical amplifier in accordance with the principles of the present disclosure.

With reference to FIG. 7, another non-limiting example photonics integrated circuit (PIC) chip 2 in accordance with the principles of the present disclosure may, with one exception (discussed next), include same elements that operate in the same manner as the standalone transmit optical amplifier of FIG. 5 (namely, the first optical isolator 10, the coupler 12, the pump light source 14, the optical fiber 16, the second optical isolator 18, the GFF 40, the VOA 38, and at least optical waveguides 6, 8). The exception in this example is the introduction of an output optical demultiplexer 52 formed on the substrate 4 having an optical input 54 coupled via part of waveguide 8 to receive a multiplexed optical signal from the VOA 38, to demultiplex the multiplexed optical signal received from the VOA 38, and to transmit the demultiplexed optical signals (Tx Out 1, Tx Out 2, . . . , Tx Out X) to downstream optical elements or receivers via output optical waveguides 52 formed on the substrate 4.

In this example, the combination of the first optical isolator 10, the coupler 12, the pump light source 14, the optical fiber 16, the second optical isolator 18, the GFF 40, the VOA 38, the output optical demultiplexer 52, and at least optical waveguides 6, 8 comprise a standalone transmit optical amplifier that may be used in an optical fiber transmission network to demultiplex an optical signal received (Tx In) from an upstream optical source and to transmit the demultiplexed optical signals (Tx Out 1, Tx Out 2, . . . , Tx Out X) to downstream optical elements or receivers.

One or more photodiodes (PD) 58 may be coupled to one or more of the optical waveguides at any suitable and/or desirable locations for monitoring a power or intensity of light propagating in the optical waveguide to which the PD 58 is coupled. In the non-limiting example shown in FIG. 7, PDs 58 are connected to optical waveguide 6 (e.g., between Tx In and first optical isolator 10) and to optical waveguide 8 (e.g., between GFF 40 and VOA 38, and between VOA 38 and the optical demultiplexer 52). Moreover, a PD 58 is connected to each output optical waveguide 52. However, one or more additional PDs 58 may also be coupled to any one or more other suitable and/or desirable points of each optical waveguide.

In the various non-limiting example photonics integrated circuit (PIC) chips 2 in accordance with the principles of the present disclosure described above, the labeling of the various inputs and outputs, e.g., Tx In, Tx Out, Rx In, Rx Out, etc., is strictly for the purpose of description and not of limitation. For example, depending on the application, an input "In" may be considered be a Tx In or an Rx In and/or an output "Out" may be considered a Tx Out or an Rx Out. Accordingly, the labeling of the various inputs and outputs as Tx In, Tx Out, Rx In, Rx Out, etc. is not to be construed in a limiting sense.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A photonics integrated circuit (PIC) chip comprising:
a substrate formed of semiconductor material;
first and second optical waveguides formed on the substrate, wherein each optical waveguide defines a path having first and second ends;

a first optical isolator formed on the substrate in the path of the first optical waveguide to receive light input into the first end of the first optical waveguide, wherein the first optical isolator is operative for allowing the passage of the light input into the first end of the first optical waveguide and to avoid or prevent a reflection of the light back to the first end of the first optical waveguide after passage through the first optical isolator;
a coupler formed on the substrate in the path of the first optical waveguide after the first optical isolator, wherein the coupler is operative for combining the light from the first optical isolator with light from a pump light source positioned off of the substrate and for outputting the combined light from the coupler via the second end of the first optical waveguide to an optical fiber positioned off of the substrate; and
a second optical isolator formed on the substrate in the path of the second optical waveguide to receive the combined light input into the first end of the second optical waveguide from the optical fiber, wherein the second optical isolator is operative for allowing the passage of the combined light input into the first end of the second optical waveguide from the optical fiber and to avoid or prevent a reflection of the combined light back to the first end of the second optical waveguide after passage through the second optical isolator.

2. The PIC chip of claim 1, further including:
third and fourth optical waveguides formed on the substrate, wherein each optical waveguide defines a path having first and second ends;
a third optical isolator formed on the substrate in the path of the third optical waveguide to receive light input into the first end of the third optical waveguide, wherein the third optical isolator is operative for allowing the passage of the light input into the first end of the third optical waveguide and to avoid or prevent a reflection of the light back to the first end of the third optical waveguide after passage through the third optical isolator;
a second coupler formed on the substrate in the path of the third optical waveguide after the third optical isolator, wherein the second coupler is operative for combining the light from the third optical isolator with light from the pump light source positioned off of the substrate and for outputting the combined light from the second coupler via the second end of the third optical waveguide to a second optical fiber positioned off of the substrate; and
a fourth optical isolator formed on the substrate in the path of the fourth optical waveguide to receive the combined light input into the first end of the fourth optical waveguide from the second optical fiber, wherein the fourth optical isolator is operative for allowing the passage of the combined light input into the first end of the fourth optical waveguide from the second optical fiber and to avoid or prevent a reflection of the combined light back to the first end of the fourth optical waveguide after passage through the fourth optical isolator.

3. The PIC chip of claim 2, further including a coherent receiver formed on the substrate and having an input (R) coupled to the second end of the fourth optical waveguide.

4. The PIC chip of claim 2, further including:
at least one tap photodiode formed on the substrate and coupled to at least one of the first and second optical waveguides; and at least one tap photodiode formed on the substrate and coupled to at least one of the third and fourth optical waveguides, wherein each tap photodiode is operative for monitoring a power of the light propagating in the optical waveguide to which the tap photodiode is coupled.

5. The PIC chip of claim 1, further including a coherent transmitter formed on the substrate and having an output (T) coupled to the first end of the first optical waveguide and an input coupled to an output of a continuous wave (CW) light source positioned off of the substrate.

6. The PIC chip of claim 5, further including one of the following formed on the substrate in the path of the second optical waveguide between the second optical isolator and the second end of the second optical waveguide:

(a) a tunable optical filter (TOF) formed on the substrate in the path of the second optical waveguide after the second optical isolator, the TOF configured to transmit the combined light from the second optical isolator in a predetermined range of wavelengths and to absorb light at other wavelengths, and a variable optical attenuator (VOA) formed on the substrate in the path of the second optical waveguide after the TOF, the VOA configured to reduce a power level of the transmitted combined light in the predetermined range of wavelengths from the TOF and to output the reduced power level transmitted combined light to the second end of the second optical waveguide; and (b) a gain flatness filter (GFF) formed on the substrate in the path of the second optical waveguide after the second optical isolator, wherein the GFF is operative for flattening or smoothing out unequal intensities over a predetermined wavelength range in the combined light from the second optical isolator and to output the flattened or smoothed out combined light to the second end of the second optical waveguide.

7. The PIC chip of claim 5, further including:

third and fourth optical waveguides formed on the substrate, wherein each optical waveguide defines a path having first and second ends;

a third optical isolator formed on the substrate in the path of the third optical waveguide to receive light input into the first end of the third optical waveguide, wherein the third optical isolator is operative for allowing the passage of the light input into the first end of the third optical waveguide and to avoid or prevent a reflection of the light back to the first end of the third optical waveguide after passage through the third optical isolator;

a second coupler formed on the substrate in the path of the third optical waveguide after the third optical isolator, wherein the second coupler is operative for combining the light from the third optical isolator with light from the pump light source positioned off of the substrate and for outputting the combined light from the second coupler via the second end of the third optical waveguide to a second optical fiber positioned off of the substrate;

a fourth optical isolator formed on the substrate in the path of the fourth optical waveguide to receive the combined light input into the first end of the fourth optical waveguide from the second optical fiber, wherein the fourth optical isolator is operative for allowing the passage of the combined light input into the first end of the fourth optical waveguide from the second optical fiber and to avoid or prevent a reflection of the combined light back to the first end of the fourth optical waveguide after passage through the fourth optical isolator; and a coherent receiver formed on the substrate and having an input (R) coupled to the second end of the fourth optical waveguide.

8. The PIC chip of claim 7, further including;

at least one tap photodiode formed on the substrate and coupled to at least one of the first and second optical waveguides; and at least one tap photodiode formed on the substrate and coupled to at least one of the third and fourth optical waveguides, wherein each tap photodiode is operative for monitoring a power of the light propagating in the optical waveguide to which the tap photodiode is coupled.

9. The PIC chip of claim 5, further including:

a third optical waveguide formed on the substrate, wherein the third optical waveguide defines a path having first and second ends; and a coherent receiver formed on the substrate and having an input (R) coupled to the second end of the third optical waveguide.

10. The PIC chip of claim 5, further including at least one tap photodiode formed on the substrate and coupled to at least one of the first and second optical waveguides, wherein each tap photodiode is operative for monitoring a power of the light propagating in the optical waveguide to which the tap photodiode is coupled.

11. The PIC chip of claim 1, further including one of the following formed on the substrate in the path of the second optical waveguide between the second optical isolator and the second end of the second optical waveguide:

(a) a tunable optical filter (TOF) formed on the substrate in the path of the second optical waveguide after the second optical isolator, the TOF configured to transmit the combined light from the second optical isolator in a predetermined range of wavelengths and to absorb light at other wavelengths, and a variable optical attenuator (VOA) formed on the substrate in the path of the second optical waveguide after the TOF, the VOA configured to reduce a power level of the transmitted combined light in the predetermined range of wavelengths from the TOF and to output the reduced power level transmitted combined light to the second end of the second optical waveguide; and (b) a gain flatness filter (GFF) formed on the substrate in the path of the second optical waveguide after the second optical isolator, wherein the GFF is operative for flattening or smoothing out unequal intensities over a predetermined wavelength range in the combined light from the second optical isolator and to output the flattened or smoothed out combined light to the second end of the second optical waveguide.

12. The PIC chip of claim 11, further including at least one tap photodiode formed on the substrate and coupled to at least one of the first and second optical waveguides, wherein each tap photodiode is operative for monitoring a power of the light propagating in the optical waveguide to which the tap photodiode is coupled.

13. The PIC chip of claim 1, further including an input optical multiplexer formed on the substrate, the input optical multiplexer operative for combining light signals received at a plurality of optical inputs of the input optical multiplexer via input optical waveguides formed on the substrate, and for outputting the combined light signals into the first end of the first optical waveguide.

14. The PIC chip of claim 13, further including a gain flatness filter (GFF) formed on the substrate in the path of the second optical waveguide after the second optical isolator, wherein the GFF is operative for flattening or smoothing out unequal intensities over a predetermined wavelength range in the amplified light from the second optical isolator and to output the flattened or smoothed out amplified light to the second end of the second optical waveguide.

15. The PIC chip of claim 14, further including a variable optical attenuator (VOA) formed on the substrate in the path of the second optical waveguide after the GFF, the VOA configured to reduce a power level of the flattened or smoothed out amplified light from the GFF and to output the reduced power level flattened or smoothed out amplified light to the second end of the second optical waveguide.

16. The PIC chip of claim 13, further including at least one tap photodiode formed on the substrate and coupled to at least one of the first and second optical waveguides, wherein each tap photodiode is operative for monitoring a power of the light propagating in the optical waveguide to which the tap photodiode is coupled.

17. The PIC chip of claim 13, wherein each input optical waveguide is coupled to a tap photodiode formed on the substrate.

18. The PIC chip of claim 1, further including an output optical demultiplexer formed on the substrate, the output optical demultiplexer operative for separating a light signal comprising a combination of a plurality light signals received at an optical input of the output optical demultiplexer from the second end of the second optical waveguide into a plurality of individual output light signals which are output by the output optical demultiplexer via a like plurality of output optical waveguides formed on the substrate.

19. The PIC chip of claim 18 further including a gain flatness filter (GFF) formed on the substrate in the path of the second optical waveguide after the second optical isolator, wherein the GFF is operative for flattening or smoothing out unequal intensities over a predetermined wavelength range in the amplified light from the second optical isolator and to output the flattened or smoothed out amplified light to the optical input of the output optical demultiplexer.

20. The PIC chip of claim 19, further including a variable optical attenuator (VOA) formed on the substrate in the path of the second optical waveguide after the GFF, the VOA configured to reduce a power level of the flattened or smoothed out amplified light from the GFF and to output the reduced power level flattened or smoothed out amplified light to the optical input of the output optical demultiplexer.

21. The PIC chip of claim 18, further including at least one tap photodiode formed on the substrate and coupled to at least one of the first and second optical waveguides, wherein each tap photodiode is operative for monitoring a power of the light propagating in the optical waveguide to which the tap photodiode is coupled.

22. The PIC chip of claim 18, wherein each output optical waveguide is coupled to a tap photodiode formed on the substrate.

23. The PIC chip of claim 1, further including at least one tap photodiode formed on the substrate and coupled to at least one of the first and second optical waveguides, wherein each tap photodiode is operative for monitoring a power of the light propagating in the optical waveguide to which the tap photodiode is coupled.

* * * * *